United States Patent
Chung et al.

(10) Patent No.: US 10,002,578 B2
(45) Date of Patent: Jun. 19, 2018

(54) MOVING IMPURITY IONS IN A LIQUID CRYSTAL DISPLAY DEVICE

(71) Applicant: Infovision Optoelectronics (Kunshan) Co., LTD., Kunshan, Jiangsu Province (CN)

(72) Inventors: Te-Chen Chung, Kunshan (CN); Dalei Zhang, Kunshan (CN); Zifang Su, Kunshan (CN); Yongxin Ruan, Kunshan, Jiangsu Province (CN)

(73) Assignee: INFOVISION OPTOELECTRONICS (KUNSHAN) CO., LTD., Kunshan, Jiangsu Province (CN)

( * ) Notice: Subject to any disclaimer, the term of this patent is extended or adjusted under 35 U.S.C. 154(b) by 70 days.

(21) Appl. No.: 15/183,750

(22) Filed: Jun. 15, 2016

(65) Prior Publication Data

US 2017/0061909 A1    Mar. 2, 2017

(30) Foreign Application Priority Data

Aug. 27, 2015    (CN) .......................... 2015 1 0535057

(51) Int. Cl.
*G09G 3/36* (2006.01)
*G02F 1/133* (2006.01)
(Continued)

(52) U.S. Cl.
CPC ....... *G09G 3/3614* (2013.01); *G02F 1/13306* (2013.01); *G09G 3/3677* (2013.01); *G09G 3/3688* (2013.01); *G02F 1/134363* (2013.01); *G02F 2001/133337* (2013.01); *G02F 2001/133397* (2013.01);
(Continued)

(58) Field of Classification Search
CPC . G02F 1/1333; G02F 1/13439; G09G 3/3648; G03F 7/0007
See application file for complete search history.

(56) References Cited

U.S. PATENT DOCUMENTS 6,177,968 B1 *  1/2001  Okada ............... G02F 1/134336
                                                    349/143
6,803,976 B1   10/2004  Fujioka et al.
(Continued)

FOREIGN PATENT DOCUMENTS

CN        1849549 A     10/2006
CN      101135818 A      3/2008
(Continued)

*Primary Examiner* — Sepehr Azari
(74) *Attorney, Agent, or Firm* — Cheng-Ju Chiang

(57) ABSTRACT

An LCD device includes a color filter (CF) substrate, a thin film transistor (TFT) substrate and a liquid crystal layer. The CF substrate includes a first transparent substrate, a CF layer, a black matrix and a shielding layer. The TFT substrate includes a second transparent substrate, a pixel electrode, a common electrode, and an insulating layer disposed between the pixel electrode and the common electrode. A control signal in the form of an AC voltage is provided to the shielding layer of the CF substrate, and a DC common voltage is provided to the common electrode. An alternating electric field is generated between the AC voltage of the control signal of the shielding layer and the DC common voltage of the common electrode to push impurity ions existed in the liquid crystal layer to swing up and down in the liquid crystal layer.

20 Claims, 5 Drawing Sheets

(51) Int. Cl.
 *G02F 1/1343* (2006.01)
 *G02F 1/1333* (2006.01)
(52) U.S. Cl.
 CPC ............... *G09G 2300/0426* (2013.01); *G09G 2310/0251* (2013.01); *G09G 2320/0257* (2013.01)

(56) References Cited

U.S. PATENT DOCUMENTS

2001/0011979 A1* 8/2001 Hasegawa ............ G09G 3/3648
 345/87
2007/0134883 A1* 6/2007 Lee ....................... G02F 1/1333
 438/398

FOREIGN PATENT DOCUMENTS

| | | |
|---|---|---|
| CN | 102540586 A | 7/2012 |
| CN | 104103250 A | 10/2014 |
| CN | 104238163 A | 12/2014 |
| JP | H6-289408 A | 10/1994 |
| JP | 2001-66580 A | 3/2001 |

\* cited by examiner

MOVING IMPURITY IONS IN A LIQUID CRYSTAL DISPLAY DEVICE

CROSS-REFERENCE TO RELATED APPLICATION

This application is based on and claims priority of Chinese patent application No. 201510535057.6, filed on Aug. 27, 2015. The entire disclosure of the above-identified application is hereby incorporated by reference herein and made a part of this specification.

FIELD OF THE INVENTION

The present invention relates to the field of display technology, and more particularly to a liquid crystal display (LCD) device.

BACKGROUND OF THE INVENTION

LCD devices have gradually replaced cathode ray tube (CRT) display devices, and have been widely used in various electronic devices such as high definition television (HDTV), desktop computer, personal digital assistant (PDA), notebook computer, mobile phone, digital camera, and so on, due to characteristics of thin thickness, low power consumption and low radiation etc.

An LCD device usually includes a color filter (CF) substrate, a thin film transistor (TFT) substrate, and a liquid crystal layer sandwiched between the CF substrate and the TFT substrate. A plurality of scanning lines, a plurality of data lines, a plurality of pixel electrodes, a common electrode and a plurality of TFTs are disposed on the TFT substrate. The scanning lines and the data lines are intersected with each other to define a plurality of pixel units. Each pixel unit includes a TFT and a pixel electrode formed on the pixel unit, wherein a gate electrode of the TFT is connected to a corresponding scanning line, a source electrode of the TFT is connected to a corresponding data line, and a drain electrode of the TFT is connected to the pixel electrode. When the scanning line receives a scanning signal outputted from a gate driving circuit, the TFT is turned on, and the data line receives a data signal which is a voltage outputted from a source driving circuit, and the pixel electrode is charged by the voltage of the data signal via the turned-on TFT. Therefore, a voltage difference between the pixel electrode and the common electrode drives the liquid crystal molecules in the liquid crystal layer to change arrangement, and accordingly light passed through the pixel unit is changed. After the light passes through a pair of polarizers of the LCD device, the change of the light can be presented as a change of brightness. Thus, the change of brightness of the LCD device can be controlled by controlling the voltage of the pixel electrode, so as to achieve the purpose of displaying images on the LCD device.

In the TFT, a parasitic capacitance Cgd is inevitably existed between the gate electrode and the drain electrode of the TFT. During the driving of the LCD device, at the moment when the TFT turns on or off, the voltage of the pixel electrode will change sharply and dramatically due to the sharp change of the voltage on the scanning line and the influence of the parasitic capacitance Cgd between the gate electrode and the drain electrode of the TFT. Specifically, at the moment when the TFT turns on, due to the sharp change of the voltage (i.e., from low voltage to high voltage) on the scanning line and the influence of the parasitic capacitance Cgd, an upward feed-through voltage is generated on the pixel electrode. Since the data line is charging the pixel electrode via the turned-on TFT, the pixel electrode still can be charged to a desired voltage outputted by the date line. However, at the moment when the TFT turns off, due to the sharp change of the voltage (i.e., from high voltage to low voltage) on the scanning line and the influence of the parasitic capacitance Cgd, a downward feed-through voltage is generated on the pixel electrode. After the TFT is turned off, the data line stops to charge the pixel electrode, and the voltage on the pixel electrode drops by a value of the feed-through voltage due to the influence of the parasitic capacitance Cgd. That is, the voltage on the pixel electrode will be smaller by a value of the feed-through voltage than the charged voltage of the pixel electrode as previously charged when the TFT is turned on. Therefore, the accuracy of the voltage intended to be charged on the pixel electrode is affected, and accordingly the accuracy of a gray scale displayed on the LCD device is affected, the display quality of the LCD device is thus deteriorated.

In addition, due to positive and negative impurity ions being inevitably existed in the liquid crystal molecules of the liquid crystal layer, these impurity ions are easily adsorbed on the pixel electrode and the common electrode under a driving electric field generated between the pixel electrode and the common electrode for driving the liquid crystal molecules. Therefore, an image sticking problem will be resulted on the screen of the LCD device as a result of these impurity ions, and the display quality of the LCD device is further deteriorated.

At present, a common voltage on the common electrode is usually offset in order to compensate and resolve the problem caused by the parasitic capacitance Cgd of the TFT. That is, when the common electrode has a DC (direct current) common voltage, the DC common voltage is not zero, but is offset by a value such as 3V. When the common electrode has an AC (alternating current) common voltage, a center value of the AC common voltage is not zero, but is offset by a value such as 3V. Many methods such as improving the purity of the liquid crystal molecules and improving the cleanliness of circumstance in manufacturing the LCD device are used to resolve the problem caused by the impurity ions in the liquid crystal molecules of the liquid crystal layer. However, the methods mentioned above need high cost and long adjustment period.

SUMMARY OF THE INVENTION

Accordingly, the present invention provides an LCD device which can improve display quality and solve the image sticking problem with low cost and short adjustment time period.

An LCD device in accordance with an embodiment of the present invention includes a CF substrate, a TFT substrate disposed opposite to the CF substrate, and a liquid crystal layer sandwiched between the CF substrate and the TFT substrate. The CF substrate includes a first transparent substrate, a CF layer, a black matrix, and a shielding layer, wherein the CF layer, the black matrix and the shielding layer are disposed on the first transparent substrate. The TFT substrate includes a second transparent substrate, a pixel electrode, a common electrode, and an insulating layer, wherein the pixel electrode, the common electrode and the insulating layer are disposed on the second transparent substrate, with the insulating layer being disposed between the pixel electrode and the common electrode. A control signal in the form of an AC voltage is provided to the shielding layer of the CF substrate, and a DC common voltage is provided to the common electrode. An alternating electric field is generated between the AC voltage of the control signal of the shielding layer and the DC common voltage of the common electrode to push impurity ions existed in the liquid crystal layer to swing up and down in the liquid crystal layer.

In the LCD device of the present embodiment, the control signal with an AC voltage is provided to the shielding layer of the CF substrate, the control signal is used to generate an alternating electric field together with the common electrode in the LCD device. The alternating electric field pushes the impurity ions existed in the liquid crystal molecules to swing up and down in the liquid crystal layer, and the impurity ions are prevented from being adsorbed on the pixel electrode and the common electrode. Therefore, due to the control signal with an AC voltage being provided to the shielding layer, chances of the impurity ions being adsorbed on the pixel electrode and the common electrode are significantly reduced, and the problem such as image sticking on the LCD device as an influence of the impurity ions can be greatly alleviated, whereby the LCD device can improve the display quality, and the image sticking problem is effectively solved with low cost and short adjustment time period.

Other novel features and advantages will become more apparent from the following detailed description when taken in conjunction with the accompanying drawings.

DETAILED DESCRIPTION OF THE EMBODIMENTS

In order to make the purpose, the features and the advantages of the embodiments of the present invention become more readily apparent. The present invention will now be described more specifically with reference to the following embodiments.

It is to be noted that the accompanying drawings of the present invention merely show the essential structure features related to the spirit of the invention, and omit other obvious structure features.

Figure 1:
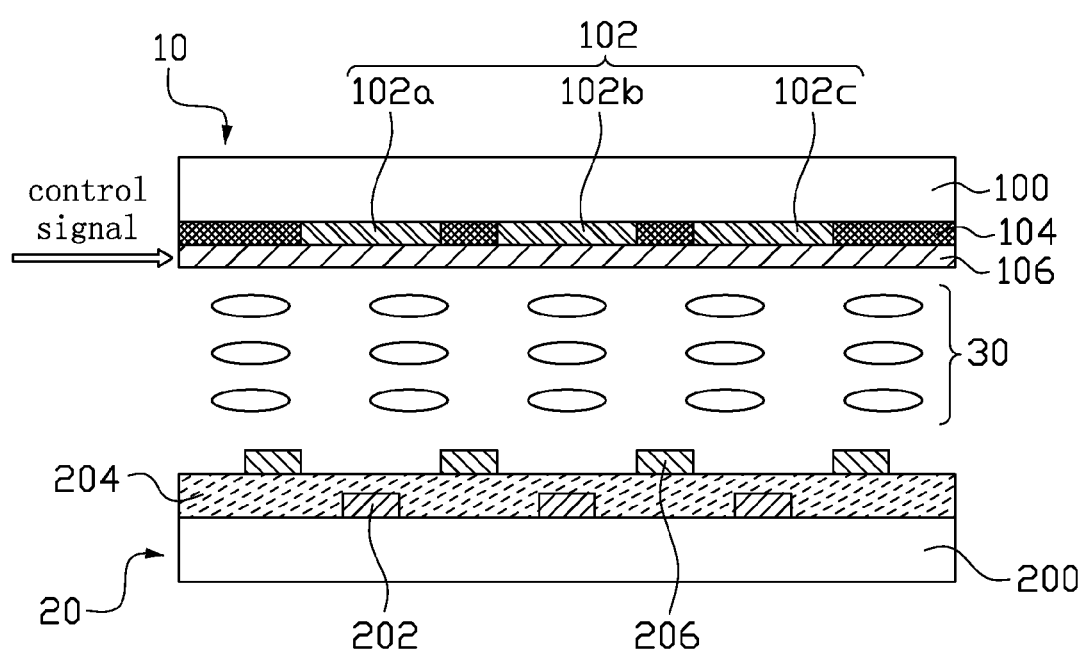
FIG. 1 is a schematic cross-sectional view of an LCD device according to a first embodiment of the present invention.

Referring to FIG. 1, FIG. 1 is a schematic cross-sectional view of an LCD device according to a first embodiment of the present invention. As shown in FIG. 1, the LCD device includes a color filter (CF) substrate 10, a thin film transistor (TFT) substrate 20, and a liquid crystal layer 30. The CF substrate 10 is disposed opposite to the TFT substrate 20, and the liquid crystal layer 30 is sandwiched between the CF substrate 10 and the TFT substrate 20. In this embodiment, liquid crystal molecules of the liquid crystal layer 30 are negative liquid crystal molecules.

Specifically, the CF substrate 10 includes a first transparent substrate 100, a color filter (CF) layer 102, a black matrix 104, and a shielding layer 106. In the exemplary embodiment, the CF layer 102 includes a red CF 102a, a green CF 102b, and a blue CF 102c as an example. The CF layer 102 is disposed on a surface of the first transparent substrate 100 facing toward the liquid crystal layer 30. The black matrix 104 is disposed at intervals of the red CF 102a, the green CF 102b and the blue CF 102c of the CF layer 102. The shielding layer 106 is disposed on the surfaces of the CF layer 102 and the black matrix 104 facing toward the liquid crystal layer 30. That is, the CF layer 102 and the black matrix 104 are disposed between the first transparent substrate 100 and the shielding layer 106. The shielding layer 106 is made of an electrically conductive material, e.g., a transparent conductive material such as indium tin oxide (ITO), but not limited thereto.

The TFT substrate 20 includes a second transparent substrate 200, a common electrode 202 disposed on the second transparent substrate 200, an insulating layer 204 disposed on the common electrode 202, and a pixel electrode 206 disposed on the insulating layer 204. That is, the insulating layer 204 is sandwiched between the common electrode 202 and the pixel electrode 206, and the common electrode 202 is located closer to the second transparent substrate 200 relative to the pixel electrode 206. It is worth noting that, although it is not shown in FIG. 1, a plurality of scanning lines, data lines and TFTs are disposed on the TFT substrate 20. The scanning lines and the data lines are intersected with each other to define a plurality of pixel units. Each pixel unit includes a TFT and a pixel electrode 206 formed on the pixel unit, wherein a gate electrode of the TFT is connected to a corresponding scanning line, a source electrode of the TFT is connected to a corresponding data line, and a drain electrode of the TFT is connected to the pixel electrode 206. When the scanning line receives a scanning signal outputted from a gate driving circuit (not shown), the TFT is turned on, the data line receives a data signal which is a voltage outputted from a source driving circuit (not shown), and the pixel electrode 206 is charged by the voltage of the data signal via the turned-on TFT. The common electrode 202 is provided with a common voltage (Vcom). Thus, a voltage difference between the pixel electrode 206 and the common electrode 202 drives the liquid crystal molecules in the liquid crystal layer 30 to rotate, and accordingly light passed through the pixel unit is changed. After the light passes through a pair of polarizers (not shown) of the LCD device, the change of the light can be presented as a change of brightness, so as to achieve the purpose of displaying images on the LCD device. The pixel electrode 206 and the common electrode 202 are made of an electrically conductive material, e.g., a transparent conductive material such as indium tin oxide (ITO), but not limited thereto.

In this embodiment, the common electrode 202 is provided with a DC (direct current) common voltage, while the pixel electrode 206 is provided with an AC (alternating current) voltage by the data signal outputted from the source driving circuit via the data line. In other words, when the LCD device displays an image, the common voltage (Vcom) provided to the common electrode 202 is constant and not changed throughout different frames of the image, and the voltage provided by the data signal to the pixel electrode 206 is changed between a positive polarity and a negative polarity in an alternating manner throughout different frames of the image (i.e., the voltage provided by the data signal to the pixel electrode 206 has a positive polarity in a first frame, the voltage provided by the data signal to the pixel electrode 206 has a negative polarity in a next second frame, and then it is repeated as the first frame and the second frame). If the LCD device displays an image at a refresh frequency of 60 Hz, then each frame will occupy 16.67 ms (=1/60 s). The LCD device employs a voltage difference between the pixel electrode 206 and the common electrode 202 as a driving voltage for driving the liquid crystal molecules of the liquid crystal layer 30 to rotate. The driving voltage will generate a horizontal electric field between the pixel electrode 206 and the common electrode 202 to control an arrangement and a rotating direction of the liquid crystal molecules of the liquid crystal layer 30 and accordingly control the light passing through the LCD device, to thereby causing the LCD device to display various gray scales. Usually, impurity ions with positive polarity or negative polarity are inevitably existed in the liquid crystal molecules of the liquid crystal layer 30. When a conventional LCD device is driven, these impurity ions are easily adsorbed on the pixel electrode and/or the common electrode under an electric field between the pixel electrode and the common electrode, which results in a problem such as image sticking on the images displayed by the conventional LCD device.

However, in the embodiment of the present invention, a control signal in the form of an AC (alternating current) voltage is provided to the shielding layer 106 for driving the impurity ions existed in the liquid crystal molecules of the liquid crystal layer 30 to oscillate between the CF substrate 10 and the TFT substrate 20. That is, when the shielding layer 106 is provided with an AC voltage as the control signal, the control signal is used to generate an alternating electric field together with the common electrode 202 in the LCD device, and the alternating electric field is orthogonal to the pixel electrode 206. Since the common voltage (Vcom) provided to the common electrode 202 is a DC common voltage, an electric field generated between the AC voltage of the control signal of the shielding layer 106 and the DC common voltage of the common electrode 202 will be an alternating electric field. The alternating electric field pushes the impurity ions existed in the liquid crystal molecules to swing up and down in the liquid crystal layer 30, and the impurity ions are prevented from being adsorbed on the pixel electrode 206 and the common electrode 202. The alternating electric field is relatively weak as compared with the horizontal electric field generated between the pixel electrode 206 and the common electrode 202. Thus, the alternating electric field will not affect the horizontal electric field between the pixel electrode 206 and the common electrode 202. Therefore, due to the control signal with an AC voltage being provided to the shielding layer 106, chances of the impurity ions being adsorbed on the pixel electrode 206 and the common electrode 202 are significantly reduced, and the problem such as image sticking on the LCD device as an influence of the impurity ions can be greatly alleviated. Thus, the LCD device can accordingly improve its display quality. The control signal provided to the shielding layer 106 can be provided by the gate driving circuit, the source driving circuit, or a circuit other than the gate driving circuit and the source driving circuit of the LCD device. Preferably, the control signal provided to the shielding layer 106 is provided by the source driving circuit of the LCD device.

Figure 2A:
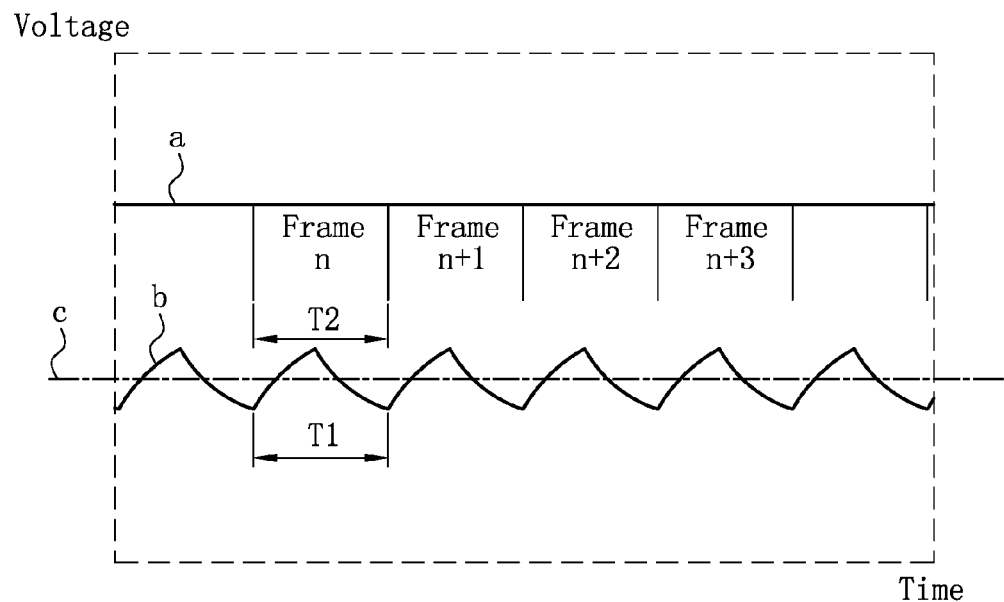
FIG. 2a is a schematic timing diagram of a control signal inputted into the shielding layer of the LCD device in FIG. 1.
Figure 2B:
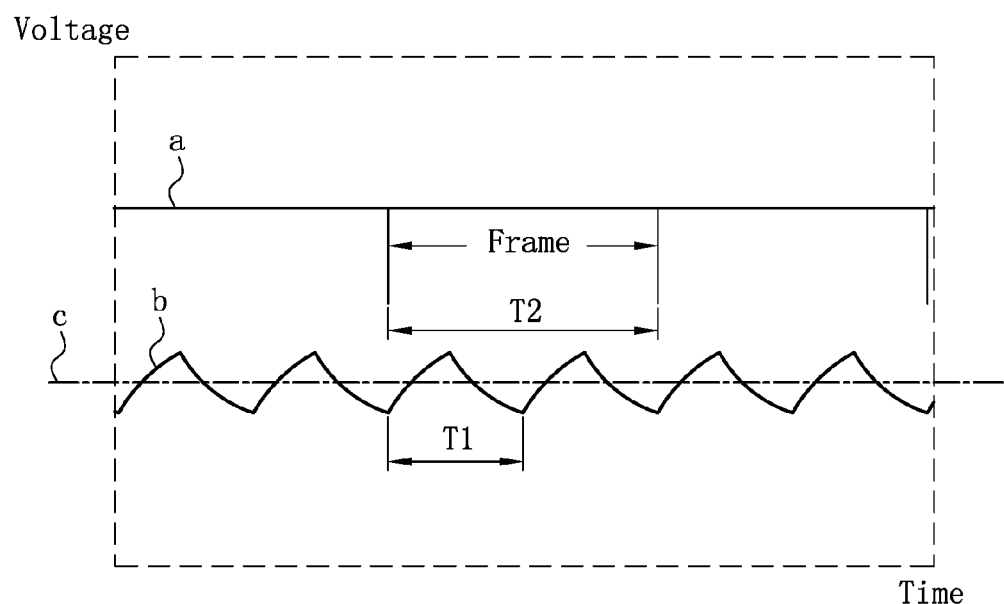
FIG. 2b is another schematic timing diagram of a control signal inputted into the shielding layer of the LCD device in FIG. 1.

Referring to FIG. 2*a*, FIG. 2*a* is a schematic timing diagram of the control signal inputted into the shielding layer 106 of the LCD device in FIG. 1. As shown in FIG. 2*a*, solid line "a" denotes the frame synchronizing signal of the LCD device, and curve "b" denotes the control signal with an AC voltage. A frequency of the control signal is larger than or equal to a refresh frequency of the LCD device. That is, one period T1 of the control signal is smaller than or equal to the period T2 of an image frame of the LCD device. Preferably, one period T1 of the control signal is equal to the period T2 of the image frame, as shown in FIG. 2*a*. In another case as shown in FIG. 2*b*, one period T1 of the control signal is equal to a half of the period T2 of the image frame. In still another case not explicitly shown, one period T1 of the control signal is equal to one third of the period T2 of the image frame. In addition, the control signal synchronizes with the frame synchronizing signal of the LCD device. That is, one period T1 of the control signal begins when the LCD device begins scanning of an image frame, and the LCD device ends scanning of the image frame when one period T1 of the control signal ends.

In an embodiment of the present invention, the AC voltage of the control signal waves around the DC common voltage of the common electrode 202. As shown in FIG. 2*a* and FIG. 2*b*, dashed line "c" denotes the DC common voltage of the common electrode 202. The AC voltage of the control signal is symmetrical relative to and waves around the DC common voltage of the common electrode 202. That is, if the DC common voltage of the common electrode 202 is 3V, then the alternating control signal waves around a center voltage of 3V, to produce an alternating electric field with the common electrode 202 to push the impurity ions existed in the liquid crystal molecules to swing up and down in the liquid crystal layer 30, whereby the impurity ions are prevented from being adsorbed on the pixel electrode 206 and the common electrode 202.

If an amplitude of the AC voltage of the control signal is too large, the horizontal electric field generated by the driving voltage between the pixel electrode 206 and the common electrode 202 can be affected by the control signal. Thus, the amplitude of the AC voltage of the control signal is preferably less than or equal to one third of an amplitude of the maximal driving voltage between the pixel electrode 206 and the common electrode 202 of the LCD device.

In an embodiment of the present invention, the AC voltage of the control signal can be one selected from sinusoidal wave, triangular wave, and square wave.

Figure 3:
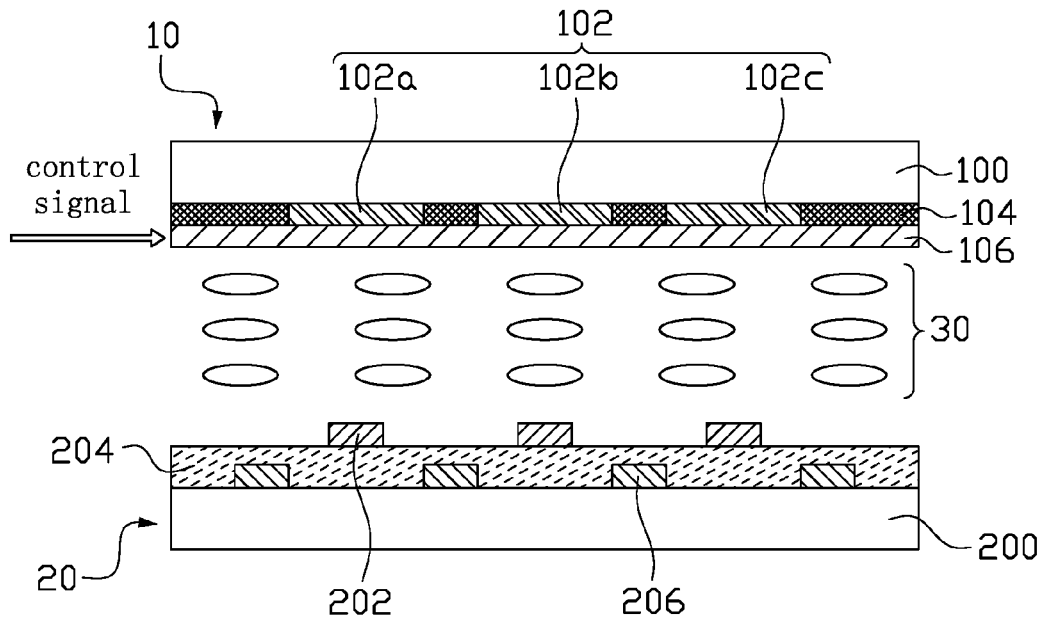
FIG. 3 is a schematic cross-sectional view of an LCD device according to a second embodiment of the present invention.

Referring to FIG. 3, FIG. 3 is a schematic cross-sectional view of an LCD device according to a second embodiment of the present invention. As shown in FIG. 3, the LCD device according to the second embodiment is similar to the LCD device according to the first embodiment as described above, and the main difference lies in that the relative locations of the pixel electrode 206 and the common electrode 202 in the TFT substrate 20 are different. In the second embodiment of the present invention, the pixel electrode 206 is disposed on the second transparent substrate 200, the insulating layer 204 is disposed on the pixel electrode 206, and the common electrode 202 is disposed on the insulating layer 204. That is, the pixel electrode 206 is located closer to the second transparent substrate 200 relative to the common electrode 202. It is noted that, other structures in the second embodiment are the same as the first embodiment as described above, therefore, a working principle of the LCD device of the second embodiment of the present invention can be easily understood with reference to the above-mentioned first embodiment of the present invention.

Figure 4:
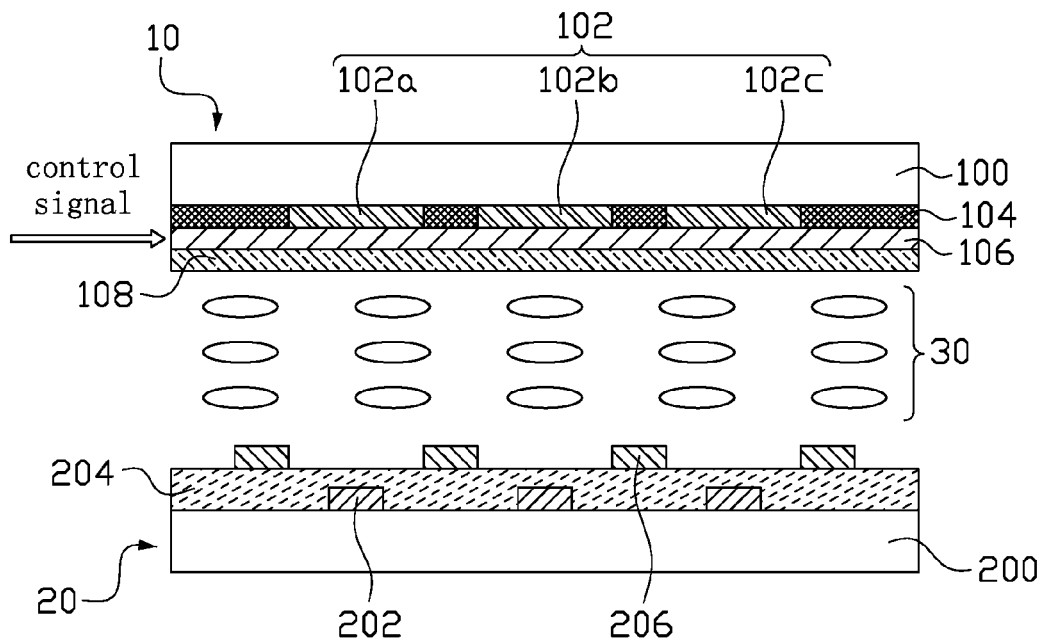
FIG. 4 is a schematic cross-sectional view of an LCD device according to a third embodiment of the present invention.

Referring to FIG. 4, FIG. 4 is a schematic cross-sectional view of an LCD device according to a third embodiment of the present invention. As shown in FIG. 4, the LCD device of the third embodiment is similar to the LCD device of the first embodiment as described above, and the main difference lies in that the CF substrate 10 further includes a planarization layer 108 disposed on the shielding layer 106. In more detail, the CF substrate 10 according to the third embodiment includes a first transparent substrate 100, a CF layer 102, a black matrix 104, a shielding layer 106, and a planarization layer 108. The CF layer 102 may include a red CF 102a, a green CF 102b, and a blue CF 102c, and the CF layer 102 is disposed on a surface of the first transparent substrate 100 facing toward the liquid crystal layer 30. The black matrix 104 is disposed at intervals of the red CF 102a, the green CF 102b and the blue CF 102c of the CF layer 102. The shielding layer 106 is disposed on the surfaces of the CF layer 102 and the black matrix 104 facing toward the liquid crystal layer 30. The planarization layer 108 is disposed on a surface of the shielding layer 106 facing toward the liquid crystal layer 30. That is, the CF layer 102 and the black matrix 104 are disposed between the first transparent substrate 100 and the shielding layer 106, and the shielding layer 106 is disposed between the planarization layer 108 and the CF layer 102 plus the black matrix 104. The planarization layer 108 is used to make smooth the outmost surface of the CF substrate 10 facing toward the liquid crystal layer 30. It is noted that, other structures in the third embodiment are the same as the first embodiment as described above, therefore, a working principle of the LCD device of the third embodiment of the present invention can be easily understood with reference to the above-mentioned first embodiment of the present invention.

Figure 5:
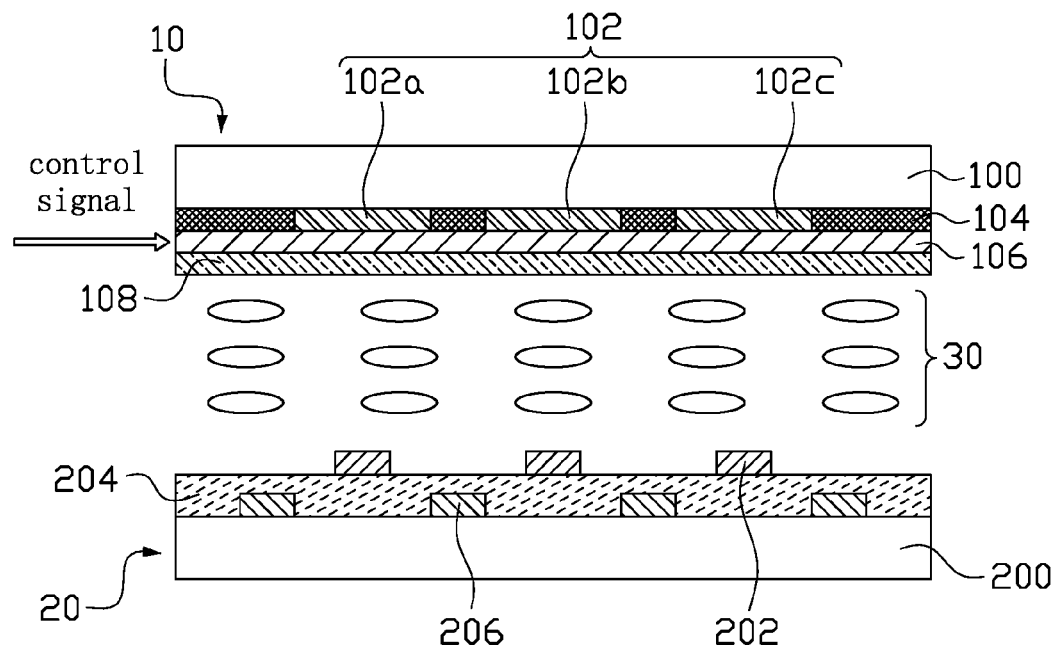
FIG. 5 is a schematic cross-sectional view of an LCD device according to a fourth embodiment of the present invention.

Referring to FIG. 5, FIG. 5 is a schematic cross-sectional view of an LCD device according to a fourth embodiment of the present invention. As shown in FIG. 5, the LCD device according to the fourth embodiment is similar to the LCD device according to the third embodiment of the present invention, and the main difference lies in that the relative locations of the pixel electrode 206 and the common electrode 202 in the TFT substrate 20 are different. In the fourth embodiment of the present invention, the pixel electrode 206 is disposed on the second transparent substrate 200, the insulating layer 204 is disposed on the pixel electrode 206, and the common electrode 202 is disposed on the insulating layer 204. That is, the pixel electrode 206 is located closer to the second transparent substrate 200 relative to the common electrode 202. It is noted that, other structures in the fourth embodiment are the same as the third embodiment as described above, therefore, a working principle of the LCD device of the fourth embodiment of the present invention can be easily understood with reference to the above-mentioned third embodiment of the present invention.

Figure 6:
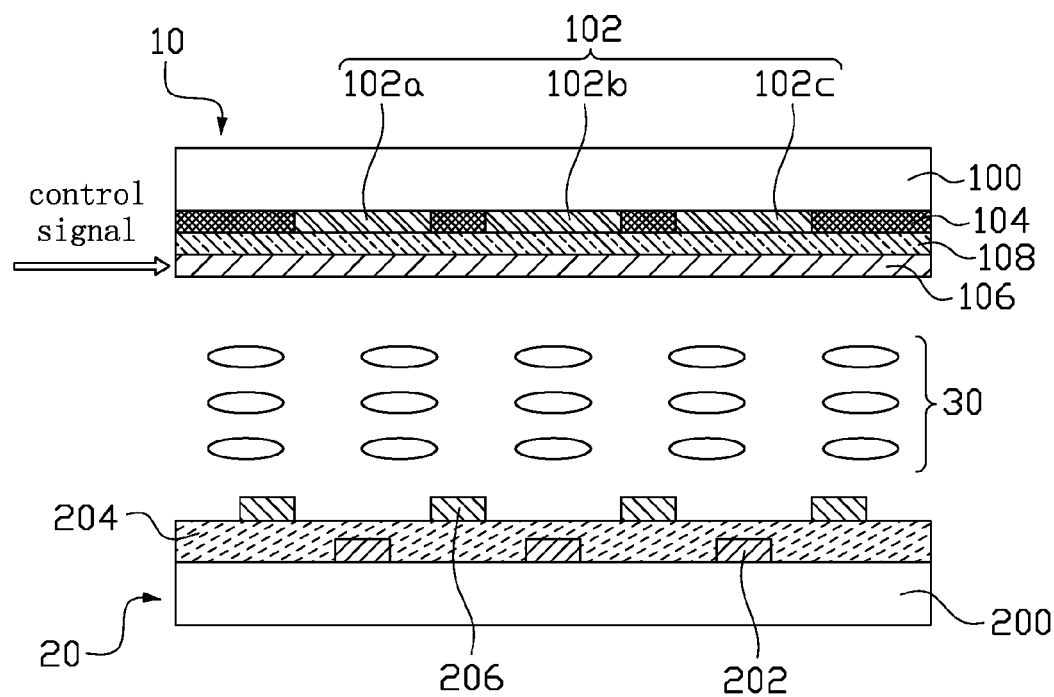
FIG. 6 is a schematic cross-sectional view of an LCD device according to a fifth embodiment of the present invention.

Referring to FIG. 6, FIG. 6 is a schematic cross-sectional view of an LCD device according to a fifth embodiment of the present invention. As shown in FIG. 6, the LCD device of the fifth embodiment is similar to the LCD device of the first embodiment as described above, and the main difference lies in that the CF substrate 10 further includes a planarization layer 108. In more detail, the CF substrate 10 according to the fifth embodiment includes a first transparent substrate 100, a CF layer 102, a black matrix 104, a shielding layer 106, and a planarization layer 108. The CF layer 102 may include a red CF 102a, a green CF 102b, and a blue CF 102c, and the CF layer 102 is disposed on a surface of the first transparent substrate 100 facing toward the liquid crystal layer 30. The black matrix 104 is disposed at intervals of the red CF 102a, the green CF 102b and the blue CF 102c of the CF layer 102. The planarization layer 108 is disposed on the surfaces of the CF layer 102 and the black matrix 104 facing toward the liquid crystal layer 30. The shielding layer 106 is disposed on a surface of the planarization layer 108 facing toward the liquid crystal layer 30. That is, the CF layer 102 and the black matrix 104 are disposed between the first transparent substrate 100 and the planarization layer 108, the planarization layer 108 is disposed between the shielding layer 106 and the CF layer 102 plus the black matrix 104. The planarization layer 108 is used to make smooth the outmost surface of the CF substrate 10 facing toward the liquid crystal layer 30. It is noted that, other structures in the fifth embodiment are the same as the first embodiment as described above, therefore, a working principle of the LCD device of the third embodiment of the present invention can be easily understood with reference to the above-mentioned first embodiment of the present invention.

Figure 7:
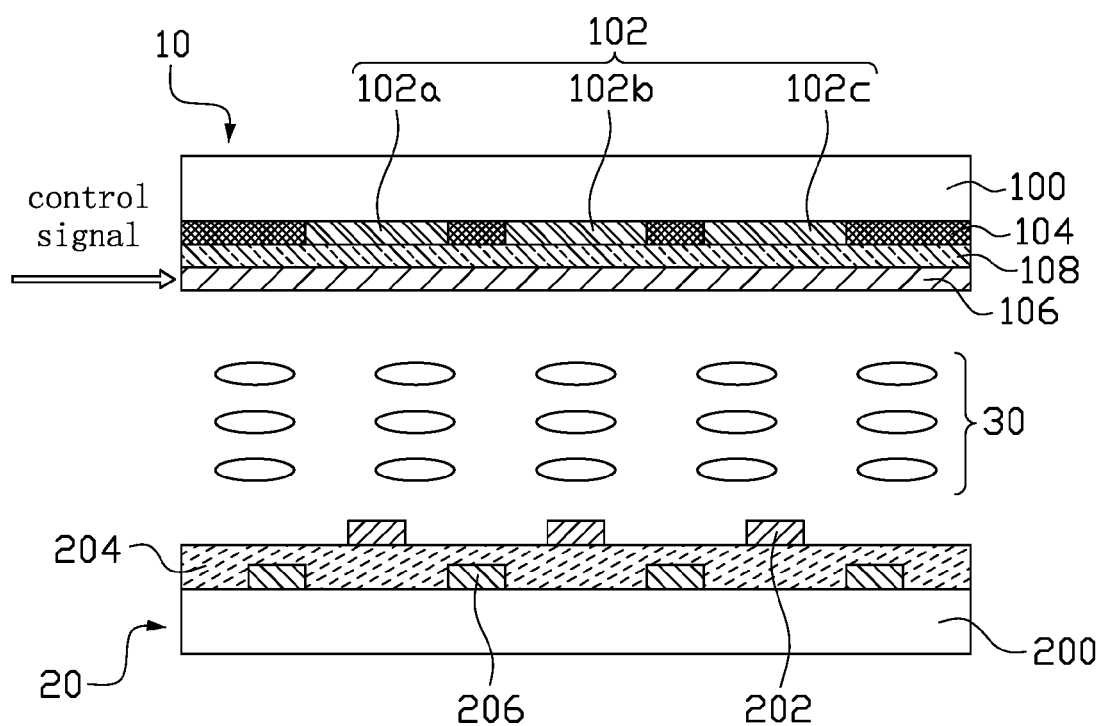
FIG. 7 is a schematic cross-sectional view of an LCD device according to a sixth embodiment of the present invention.

Referring to FIG. 7, FIG. 7 is a schematic cross-sectional view of an LCD device according to a sixth embodiment of the present invention. As shown in FIG. 7, the LCD device according to the sixth embodiment is similar to the LCD device according to the fifth embodiment of the present invention, and the main difference lies in that the relative locations of the pixel electrode 206 and the common electrode 202 in the TFT substrate 20 are different. In the sixth embodiment of the present invention, the pixel electrode 206 is disposed on the second transparent substrate 200, the insulating layer 204 is disposed on the pixel electrode 206, and the common electrode 202 is disposed on the insulating layer 204. That is, the pixel electrode 206 is located closer to the second transparent substrate 200 relative to the common electrode 202. It is noted that, a working principle of the LCD device of the sixth embodiment of the present invention can be easily understood with reference to the above-mentioned fifth embodiment of the present invention.

In the illustrated embodiments of the present invention, the control signal with an AC voltage is provided to the shielding layer 106 of the CF substrate 10, an alternating electric field can be generated between the AC voltage of the control signal and the DC common voltage of the common electrode 202 in the LCD device, the alternating electric field can push the impurity ions existed in the liquid crystal molecules to swing up and down and accordingly change distribution of the impurity ions in the liquid crystal layer 30 to reduce chances of the impurity ions being adsorbed on the pixel electrode 206 and the common electrode 202 of the TFT substrate 20. Therefore, the problem such as image sticking on the LCD device as an influence of the impurity ions can be greatly alleviated, and the LCD device can accordingly improve its display quality. Furthermore, the cost of the LCD device is low, and the LCD device merely needs short time to resolve the problem.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An LCD (liquid crystal display) device, comprising:
   a color filter (CF) substrate, the CF substrate comprising a first transparent substrate, a CF layer, a black matrix, and a shielding layer, wherein the CF layer, the black matrix and the shielding layer are disposed on the first transparent substrate;
   a thin film transistor (TFT) substrate being disposed opposite to the CF substrate, the TFT substrate comprising a second transparent substrate, a pixel electrode, a common electrode, and an insulating layer, wherein the pixel electrode, the common electrode and the insulating layer are disposed on the second transparent substrate, with the insulating layer being disposed between the pixel electrode and the common electrode; and
   a liquid crystal layer sandwiched between the CF substrate and the TFT substrate;
   wherein a control signal in the form of an AC (alternating current) voltage is provided to the shielding layer of the CF substrate, and a DC (direct current) common voltage is provided to the common electrode, an alternating electric field is generated between the AC voltage of the control signal of the shielding layer and the DC common voltage of the common electrode to push impurity ions existed in the liquid crystal layer to swing up and down in the liquid crystal layer.

2. The LCD device of claim 1, wherein one period of the control signal is smaller than or equal to a period of an image frame of the LCD device.

3. The LCD device of claim 2, wherein one period of the control signal is equal to the period of the image frame of the LCD device.

4. The LCD device of claim 2, wherein one period of the control signal is equal to a half of the period of the image frame of the LCD device.

5. The LCD device of claim 2, wherein one period of the control signal is equal to one third of the period of the image frame of the LCD device.

6. The LCD device of claim 1, wherein the control signal synchronizes with a frame synchronizing signal of the LCD device.

7. The LCD device of claim 6, wherein one period of the control signal begins when the LCD device begins scanning of an image frame, and the LCD device ends scanning of the image frame when one period of the control signal ends.

8. The LCD device of claim 1, wherein an amplitude of the AC voltage of the control signal is less than or equal to one third of an amplitude of a maximal driving voltage between the pixel electrode and the common electrode of the LCD device.

9. The LCD device of claim 1, wherein the AC voltage of the control signal waves around the DC common voltage of the common electrode.

10. The LCD device of claim 1, wherein the LCD device further comprises a source driving circuit, and the control signal provided to the shielding layer is provided by the source driving circuit of the LCD device.

11. The LCD device of claim 1, wherein the AC voltage of the control signal is one of sinusoidal wave, triangular wave, and square wave.

12. The LCD device of claim 1, wherein the shielding layer, the pixel electrode and the common electrode are each made of a transparent conductive material.

13. The LCD device of claim 1, wherein the common electrode is disposed on the second transparent substrate, the insulating layer is disposed on the common electrode, and the pixel electrode is disposed on the insulating layer.

14. The LCD device of claim 1, wherein the pixel electrode is disposed on the second transparent substrate, the insulating layer is disposed on the pixel electrode, and the common electrode is disposed on the insulating layer.

15. The LCD device of claim 1, wherein the CF substrate further comprises a planarization layer, and the planarization layer is disposed on a surface of the shielding layer facing toward the liquid crystal layer.

16. The LCD device of claim 15, wherein the common electrode is disposed on the second transparent substrate, the insulating layer is disposed on the common electrode, and the pixel electrode is disposed on the insulating layer.

17. The LCD device of claim 15, wherein the pixel electrode is disposed on the second transparent substrate, the insulating layer is disposed on the pixel electrode, and the common electrode is disposed on the insulating layer.

18. The LCD device of claim 1, wherein the CF substrate further comprises a planarization layer, and the planarization layer is disposed between the shielding layer and the CF layer.

19. The LCD device of claim 18, wherein the common electrode is disposed on the second transparent substrate, the insulating layer is disposed on the common electrode, and the pixel electrode is disposed on the insulating layer.

20. The LCD device of claim 18, wherein the pixel electrode is disposed on the second transparent substrate, the insulating layer is disposed on the pixel electrode, and the common electrode is disposed on the insulating layer.

* * * * *